United States Patent [19]

Kramer

[11] Patent Number: 4,854,992
[45] Date of Patent: Aug. 8, 1989

[54] METHOD FOR MOUNTING AN ARMATURE OF PLASTIC MATERIAL TO A JAR OF FRANGIBLE MATERIAL

[75] Inventor: Walter Kramer, Mainz, Fed. Rep. of Germany

[73] Assignee: Schott Glaswerke, Fed. Rep. of Germany

[21] Appl. No.: 184,825

[22] Filed: Apr. 22, 1988

[30] Foreign Application Priority Data

Apr. 24, 1987 [DE] Fed. Rep. of Germany ....... 3713685

[51] Int. Cl.⁴ .............................................. B32B 31/20
[52] U.S. Cl. ...................................... 156/212; 29/774; 156/221; 156/308.2; 156/309.6; 156/311; 215/100 A; 220/94 R; 264/249; 403/265; 403/267
[58] Field of Search ............ 16/110 A, 116 R, 114 R, 16/D19; 264/249, 23, 266; 29/774; 220/94 R, 94 A; 215/100 A, 100 C, 100 R; 403/265–267; 428/139, 140; 156/69, 91–93, 196, 212, 216, 221, 242, 245, 272.2, 273.3, 308.2, 309.6, 309.9, 311, 322

[56] References Cited

U.S. PATENT DOCUMENTS

| | | | |
|---|---|---|---|
| 3,076,223 | 2/1963 | Reichold | 220/94 R |
| 4,201,609 | 5/1980 | Olsen | 156/499 |
| 4,278,487 | 7/1981 | Hormanns | 156/308.6 |
| 4,484,964 | 11/1984 | Kawamata | 156/69 |
| 4,558,957 | 12/1985 | Mock | 264/249 |
| 4,566,923 | 1/1986 | Mueller | 156/69 |
| 4,596,337 | 6/1986 | Gerold | 403/265 |
| 4,683,016 | 1/1987 | Dutt | 264/249 |
| 4,683,155 | 7/1987 | Majthan | 156/276 |

FOREIGN PATENT DOCUMENTS 3220057 12/1983 Fed. Rep. of Germany .

Primary Examiner—Merrell C. Cashion, Jr.
Attorney, Agent, or Firm—Wegner & Bretschneider

[57] ABSTRACT

Method for mounting a plastic armature, particularly in the shape of a handle or an adapter designed to connect other structural parts, to a jar of frangible material like grass, ceramic, glass-ceramic, or the like by adhesively connecting the armature to the outer side of the jar, the armature comprising a shaped part which forms a positive interlock with a rim portion of the jar and the inner side thereof and thus secures the jar against dropping out from the armature upon a possible loosening of the adhesive connection, characterized in that an armature is used which comprises an extension of thermoplastic material which with projects inwardly over the rim of the jar when the armature is put into place, and in that during or after the making of the adhesive connection of the armature, the extension is softened by heating, deformed into the interlocking shaped part, and re-hardened by cooling.

7 Claims, 1 Drawing Sheet

U.S. Patent     Aug. 8, 1989     4,854,992 the shaped part is heated preferably to 150° C. to 200°
METHOD FOR MOUNTING AN ARMATURE OF PLASTIC MATERIAL TO A JAR OF FRANGIBLE MATERIAL

BACKGROUND OF THE INVENTION

The present invention relates to a method for mounting an armature of plastic material, particularly in the shape of a handle or an adapter designed to be connected to other structural parts, to a jar of frangible material like glass, ceramic, glass-ceramic, or the like, by adhesively connecting the armature to an outer surface of the jar, the armature comprising a shaped part which forms a positive interlock with a rim portion of the jar and an inner surface thereof and thereby secures the jar against dropping out from the armature if possibly the adhesive connection becomes loose.

For a plastic armature which is adhesively connected to a jar of frangible material, it is known to screw a safety hook to the armature after the adhesive connection has been made, the safety hook gripping around the upper rim of the jar to thereby hold the jar in the armature if in use the adhesive connection should become loose. The safety hook can be screwed on only after the adhesive connection has hardened; thus, an additional operation step is necessary.

A further possibility to additionally safeguard the jar in the adhesively connected armture consists in providing the armature with an integral clamping hook which is hung over the upper rim of the jar when the armature is being adhesively connected. To this purpose, special handling devices are necessary; moreover, it is still more disadvantageous that the jar can easily break when the clamping hook is hung on because this may require a considerable force, depending on tolerances of the jar due to its manufacturing process.

SUMMARY OF THE INVENTION

It is the object of the present invention to provide a method for mounting a plastic armature to a jar with the use of an adhesive connection, which method results in a mounting which is secured against a possible subsequent loosening or rupturing of the adhesive connection, which method shall be performable so that no additional operation step is necessary after the hardening of the adhesive connection, and there is no danger of breakage for the jars.

According to the invention, that object is attained by a method of the kind initially set forth, which is characterized in that an armature is used which comprises an extension of thermoplastic material projection inwardly over the rim of the jar when the armature is put in place, and in that during or after the making of the adhesive connection, the extension is softened by heating, deformed into the inlocking shaped part, and re-hardened by cooling. By this deformig of the extension projecting from the armature, an interlocking shaped part in the form of a safety tongue is created which extends over the rim portion onto an inner side of the rim portion of the jar and prevents that the jar drops out from the armature upon a possible subsequent loosening or rupturing of the adhesive connection. As a material for the armature and/or the extension, preferably ABS (acrylnitrile/butadiene/styrene mixed polymer) or polycarbonate are used; these materials can form a strong adhesive connection with glass, have a high strength and are easily workable.

With usual plastic materials, the deformation area of the armature where the extension shall be deformed into the shaped part is heated preferably to 150° C. to 200° C. for the deforming; these temperatures can be produced conveniently with simple equipment, preferably by the application of heated air or by a irradiation with a radiant heat source.

To facilitate the deforming process, preferably a notch is provided on the inner side of the extension, i.g. on the side directly opposite to the rim portion of the jar.

The deforming preferably consists essentially in a simple bending of the heated extension. This operation can be performed particularly easily.

For the deformation preferably a shaped piece is used as a tool; thereby, a desired shape of the shaped part is exactly produced in a simple manner, and it is easily possible by means of the shaped piece to form the shaped part and to engage it with the inner side of the jar simultaneously with the forming of the adhesive interconnection between the armature and the jar, whereby after the curing of the adhesive connection, no further operational step is necessary to secure the adhesively connected armature against subsequent loosening or rupturing of the adhesive connection. It is appropriate to employ an armature with an integral extension. This simplifies manufacture and storage.

Since the heated and thus softened extension can be deformed without the application of substantial force, there is no danger of breakage for the jar during the production of the shaped part. Moreover, an optimum positive connection of the shaped part with the interior side of the upper rim of the jar is obtained by the deforming on the jar; the shaped part can be fit in place till it contacts the inner side of the jar.

BRIEF DESCRIPTION OF THE DRAWINGS

An embodiment of the present invention will be subsequently explained by means of the drawings.

DETAILED DESCRIPTION OF THE DRAWINGS

Figure 1:
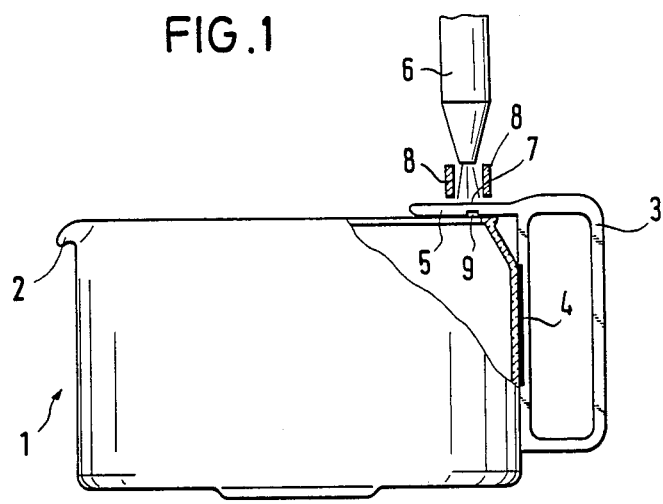
FIG. 1 is a diagrammatic vertical sectional view of a glass jar and an armature arranged in lateral contact therewith, the armature having an integral extension and being shown prior to the deformation thereof.
Figure 2:
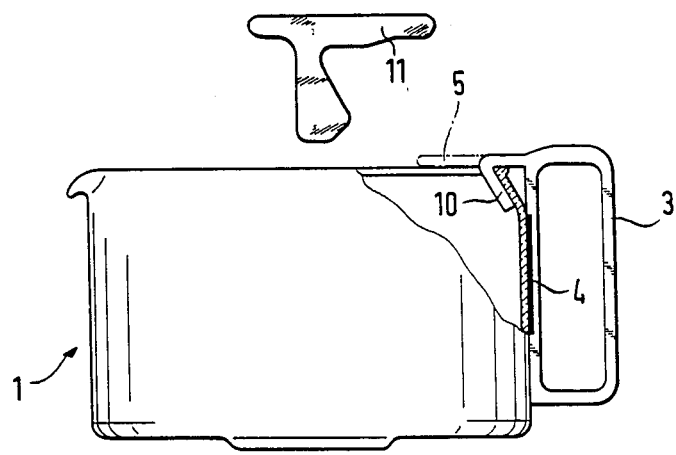
FIG. 2 is an illustration corresponding to FIG. 1 and shows the configuration obtained after the deformation of the extension.

As can be seen from FIG. 1, a glass jar 1 has a spount 2. At a point of the glass jar 1 which is disposed opposite to the spout 2, an armature 3 of ABS plastic material (acrylnitrile/butadiene/styrene mixed polymer) is arranged which is held on the jar 1 by an adhesive connection 4. The armature 3 forms a handle for holding the glass jar 1. Still during the making of the adhesive connection between the glass jar 1 and the armature 3, an extension 5 which is integrally formed on the upper side of the armature 3 is locally heated from above by means of a hot air blower 6 to about 170° C. in a desired deformation area 7. A shield 8 limits the heating of the extension locally. A notch 9 provided at the lower side of the extension 5 in the illustrated embodiment, the deformation of the extension 5. In the illustrated embodiment, the deformation mainly consists in a bending of the extension 5 onto the inner side of the glass jar 1. FIG. 2 shows the shaped part 10 formed by the deforming of the extension 5, which forms a positive connection gripping over the upper rim of the glass jar 1, thus giving additional support to the armature and preventing a dropping out of the glass jar 1 in case of a possible rupturing of the adhesive connection 4.

Moreover, a shaped piece 11 is indicated in FIG. 2 which may serve as a tool to conveniently deform the extension 5 to size.

I claim:

1. A method for mounting an armature of plastic material, particularly in the shape of a handle or an adapter designed to be connected to other structural parts, to a jar of frangible material such as glass, ceramic, or glass-ceramic, the armature comprising an extension of thermoplastic material, wherein the method comprises the steps of:
   (a) adhesively connecting the armature to an outer surface of the jar;
   (b) heating the extension to form a shaped part which will form a positive interlock with a rim portion of the jar and an inner surface thereof;
   (c) deforming the interlock portion to secure the jar against dropping out from the armature; and,
   (d) hardening the extension by cooling.

2. The method according to claim 1, wherein a shaping tool is used for deforming the extension.

3. The method according to claim 1, wherein the armature consists of ABS (acrylnitrile/butadiene/styrene mixed polymer) or of polycarbonate.

4. A method according to claim 1, wherein the extension of plastic material is softened at a temperature of 150° to 200° C.

5. A method according to cliam 1, wherein the armature includes a notch which is provided on the inner side of the extension.

6. A method according to claim 1, wherein the extension is an integral part of the armature.

7. A method according to claim 1, wherein the step of heating the extension is performed during the step of adhesively connecting the armature to the jar.

* * * * *